(12) United States Patent
    Cottrell

(10) Patent No.: US 12,634,659 B2
(45) Date of Patent: May 19, 2026

(54) RADIO CREW ISOLATION SYSTEM

(71) Applicant: Rugged Race Products, Inc., Arroyo Grande, CA (US)

(72) Inventor: Greg Cottrell, Arroyo Grande, CA (US)

(73) Assignee: Rugged Race Products, Inc., Arroyo Grande, CA (US)

( * ) Notice: Subject to any disclaimer, the term of this patent is extended or adjusted under 35 U.S.C. 154(b) by 768 days.

(21) Appl. No.: 18/076,272

(22) Filed: Dec. 6, 2022

(65) Prior Publication Data

US 2023/0179961 A1      Jun. 8, 2023

Related U.S. Application Data

(60) Provisional application No. 63/286,664, filed on Dec. 7, 2021.

(51) Int. Cl.
*H04W 4/06* (2009.01)
*H04W 8/18* (2009.01)

(52) U.S. Cl.
CPC .............. *H04W 4/06* (2013.01); *H04W 8/18* (2013.01)

(58) Field of Classification Search
CPC ......... H04W 4/10; H04W 12/10; H04W 4/06; H04W 4/08; H04W 8/18; H04L 63/104
See application file for complete search history.

(56) References Cited

U.S. PATENT DOCUMENTS

| | | | | |
|---|---|---|---|---|
| 5,195,087 A | * | 3/1993 | Bennett ................... | H04M 1/80 |
| | | | | 379/202.01 |
| 6,954,639 B1 | * | 10/2005 | James ................. | H04M 1/6083 |
| | | | | 455/66.1 |
| 7,069,030 B2 | * | 6/2006 | Yoon ................... | H04W 88/184 |
| | | | | 455/575.1 |
| 8,996,059 B2 | * | 3/2015 | Mumick ................ | H04M 1/65 |
| | | | | 455/466 |
| 10,523,818 B1 | * | 12/2019 | Rathnam ................ | H04W 4/38 |
| 2003/0193930 A1 | * | 10/2003 | Wotherspoon .......... | H04W 4/10 |
| | | | | 370/310 |
| 2012/0003969 A1 | * | 1/2012 | Anderson ............. | H04W 76/40 |
| | | | | 455/414.2 |
| 2012/0140933 A1 | * | 6/2012 | Sherwood .............. | H04R 27/00 |
| | | | | 381/86 |
| 2012/0202485 A1 | * | 8/2012 | Mirbaha ............... | H04W 76/45 |
| | | | | 455/426.1 |
| 2019/0364492 A1 | * | 11/2019 | Azizi ....................... | H04L 67/12 |
| 2023/0179961 A1 | * | 6/2023 | Cottrell ................... | H04W 8/18 |
| | | | | 455/414.1 |

* cited by examiner

*Primary Examiner* — Jeanette J Parker
*Assistant Examiner* — Dung L Lam
(74) *Attorney, Agent, or Firm* — Jonathan Pearce; SoCal IP Law Group LLP

(57) ABSTRACT

There is disclosed a communication device. The communications device includes a radio transceiver for transmitting and receiving radio transmissions, a radio frequency channel selector for selecting a desired radio frequency channel upon which to transmit and receive radio transmissions, and a crew isolation toggle, integral to the communication device, for disabling generation of audio transmission from selected members of the radio frequency channel to the radio frequency channel while still enabling the selected members to receive audio transmission.

17 Claims, 6 Drawing Sheets

Home Base Communications Device 120

Handheld Communications Device 122

Headset Communications Device 124

100

Communications Device A 110

Communications Device B 112

Communications Device C 114

200

300

Volume

Crew Isolation

Communications Device A 110

RADIO CREW ISOLATION SYSTEM

RELATED APPLICATION INFORMATION

This patent claims priority from U.S. provisional patent application No. 63/286,664 entitled "RADIO CREW ISOLATION SYSTEM" filed on Dec. 7, 2021.

NOTICE OF COPYRIGHTS AND TRADE DRESS

BACKGROUND

Field

This invention relates to radio frequency communications and, more particularly, to a radio communications system that enables dynamic control and isolation of audio systems.

Description of the Related Art

Outdoor activities such as dirt biking, UTVing, off-roading, mountain biking, skiing, and others tend to involve individuals acting in spaces that are remote from typical communications networks such as mobile phones or loudspeakers. Many or most of these activities can be dangerous or involve safety risks for accidents or simply because individuals participate in them in inhospitable areas such as deserts or high-altitude mountains or forests. Also, these activities are often strenuous on the individuals involved and on any equipment such as tires, power trains, suspensions, skis, bike frames, and the like. Finally, the motors or engines sometimes involved can generate a great deal of noise, making it difficult to merely speak to individuals riding along with a driver.

As a result, participants in these kinds of activities tend to rely upon short-range radio frequency communications to communicate with one another. Typically, these radio transceivers are incorporated into safety helmets for the participants. However, other transceivers may be built into headsets worn by individuals, for example, at a basecamp or a race starting point, finishing point, or any number of checkpoints along the way. Handheld radio transceivers are also common, which may be used with or without headsets or earpieces.

Increasingly, recreational activities of these sorts are family activities. For example, UTVs including both front and back seats have become quite popular and common. In a typical case, a group of families may take out two UTVs for a recreational weekend, with a husband and wife, perhaps a friend of one or both, along with their two children. Friends of their children may join, and another team may join as well. At least one husband or wife may remain behind in a basecamp to prepare for their return (e.g. preparing lunch, simply napping or reading while on a long-weekend vacation, or the like). That person may don a headset or use a handheld radio set to a frequency on which his or her family will communicate while the rest of the family is out UTVing.

The driver of one or both of the UTVs will set their UTV mounted radios to the same frequency along with the other riders in the UTV. Helmets of the driver and passengers may connect to our integrate with the UTV mounted radio. In this way, everyone involved in the UTVing can be in touch with everyone else. If someone is hurt, or their UTV malfunctions or an accident happens, the others can be alerted, and guided to the rescue. More basically, the individual at the basecamp can be kept apprised of the status of the activities, an expected return, and be prepared when they return. In a race scenario, drivers and spotters (the front passenger) can inform race operations for their team of problems with their vehicles in anticipation of pit stops along the way so that repairs may be made, water may be available, or for other purposes to increase the amount of time out having fun or on the course and decrease the downtime.

For families, these front and back seat UTVs along with a single radio frequency introduce a novel problem. The back riders tend to have little to do with navigation and driving. They are often children or mere passengers along for the ride. As a UTV bounces along, flies over dunes, or otherwise engages in fun activities, the back participants—particularly children—tend to squeal or scream or otherwise voice their excitement. Sometimes, when this is happening, the associated group radio frequency is filled with meaningless information. As these activities sometimes can be dangerous, the spotter and driver communications in particular can be important. The spotter can sometimes see hazards or risks unknown to the driver simply based upon position within the vehicle. The radio frequency communications are the only way these two can quickly communicate with one another. Similarly, if a UTV is involved in an accident, the individual in the basecamp may need to quickly work with the driver or spotter to arrange a rescue or emergency response. In these cases, it may be unsafe or simply undesirable for the radio frequency to be filled with unnecessary information or noise from a subset of passengers.

Figure 1:
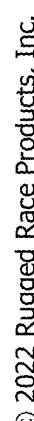
FIG. 1 is a system overview for a communications system.
Figure 1:
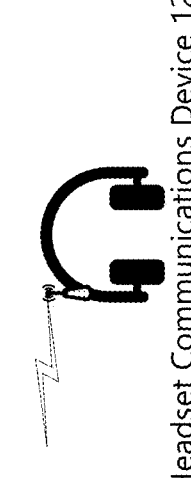
Figure 1:
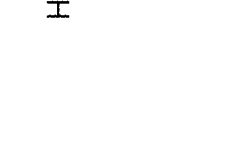
Figure 1:
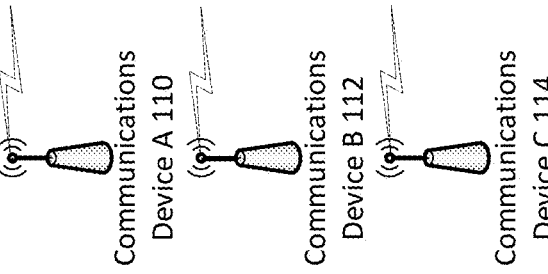

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

A feature to selectively disable audio transmission from a subset of passengers with the rest of the selected channel is desirable. This feature may disable, for example, the two rear passenger's audio transceivers upon selection of a button or other enablement of the feature. Preferably, those two passengers can still communicate with one another. To enable this functionality, the functionality may temporarily transfer the two passengers to a different channel when the function is engaged. In this way, those two passengers may continue to communicate with one another, while the others remain on the original channel and cannot hear or be heard by the passengers.

In another way of enabling this functionality, the two passengers may be able to hear two channels simultaneously, the original channel, and their own, new channel, but may only communicate with one another on the new channel in which they are alone together. In this way, the driver and spotter may still communicate with the passengers, but the passengers are not able to disturb the primary channel by communicating in response.

In yet another way of enabling this functionality, the two passengers may effectively be "muted" on the main channel and may continue to hear the other communications on that channel. This option is not preferable, because it limits the ability of the isolated passengers to communicate with one another. And, a decent portion of the enjoyment of these types of outdoor activities is experiencing them with one's friends and family. Fully muting passengers may eliminate some of the fun and may be unsafe in some cases.

Though described herein as "the two passengers," the channels to be isolated from the primary channel may be any one of the individuals communicating with the UTV or other outdoor activity. In most cases it may be backseat passengers, but these need not always be the case. Perhaps two passengers, each in separate UTVs traveling together, wish to engage in conversation and wish to be isolated from the remainder of the crew so as to have their own private conversation. Many permutations of this functionality are possible. Herein is merely described the most common.

To enable this functionality, a simple button may be used which enables the separate channels, selective muting, or mixed participation in the available channels. However, it may actually be implemented, for ease of use, a single button is preferable. In other cases, a dial may be used wherein a driver using the radio system may select between two different functions (e.g. crew isolate on, crew isolate off) or between several different implementations discussed herein (e.g. passenger mute, channel crew isolate, passenger mixed isolate, and open channels). The button, dial, or other control mechanism may be dash mounted, integrated into a radio transceiver, or may be a toggle mounted on a helmet, headset, or panel.

FIG. 1 is a system overview for a communications system. The system 100 includes a communications device A 110, a communications device B 112, a communications device C 114, a home base communications device 120, a handheld communications device 122, and a headset communications device 124. Though shown as a system 100, in use a given system may include more or fewer of any of the types of communications devices shown and may include devices in other form factors as well such as mobile phones, wrist-won communications devices, or handsfree communications devices.

The communications device A 110, communications device B 112, and communications device C 114 are interchangeable and include the same or substantially the same components and functions. They are representative of devices used in a location remote from the home base communications device 120, but they are intentionally somewhat generic in form. Any one of those devices may be, at a given time, a home base communications device 120. There is no particular aspect of any of these communications devices that set them apart from one another, other than perhaps form factor, portability (e.g. battery or power plug, weight and whether they are worn or held or mounted in another device), and typical use cases.

The communications devices A, B, and C 110, 112, and 114 may be, for example, dashboard mounted radio transceivers within UTVs, 4×4 vehicles, or may be bike-mounted communications devices. Such devices often operate to connect multiple headset/microphone combinations (either in helmets or head-mounted) through cabling from the back of such systems. In those cases, a single radio transceiver can receive the signal for all listeners and speakers connected to the system. The connections between such devices and speaker/microphone combinations may also be wireless in some cases. Other form factors are possible as well.

Each communications device incorporates a radio transceiver, an antenna, a microphone and a speaker, along with associated circuitry to enable the communications devices to communicate with the other devices using radio signals to transmit radio waves representative of audio from one device to another device (or to all devices, if the same channel is selected). These devices are shown as a system 100, but more or fewer of them may be present than depicted.

The home base communications device 120 is a communications device that is used at a location set up as a home base. So, for example, in the case of a UTV experience, the home base communications device 120 may be one fixed within or as a part of a mobile vehicle that is set up as a location to which the UTVs return for lunch, and where a campsite is or where transportation out of the UTV area is available. It may simply be a handheld communications device, a headset or other form factors. But, traditionally, it would be a vehicle-mounted radio communications systems (similar to an old-style CB radio) in or below a dash of the vehicle. Alternatively, it may be set up on a table or in a tent. In other cases, particularly farming or similar scenarios, a home base communications device 120 may be within a residence or agricultural building.

The handheld communications device 122 is a communications device that can be held in the hand. It is typically battery powered and designed for use with one hand. It may incorporate wired or wireless connectivity options such as attaching a traditional 3.5 mm audio jack for use with a headset or earpiece speaker/microphone combination to thereby make the handheld communications device 122 into more of a headset communications device. Though, the handheld communications device 122 typically includes a belt clip or other clip to be attached to the person wearing the wired headset. Wireless headsets are also sometimes used with handheld communications device 122, such as Bluetooth® devices.

The headset communications device 124 is a communications device in a form to be worn on a user's head. The headset communications device 124 typically includes a microphone stalk that extends toward a user's mouth to pick up on audio from the user. The headset communications device 124 may be stand-alone, integrating all the necessary components for wireless radio communications (e.g. transceiver, batteries, microphone, speaker, control buttons, etc.). Or, it may merely be a conduit—through wireless connection—to another device that includes some or all of those components.

Figure 2:
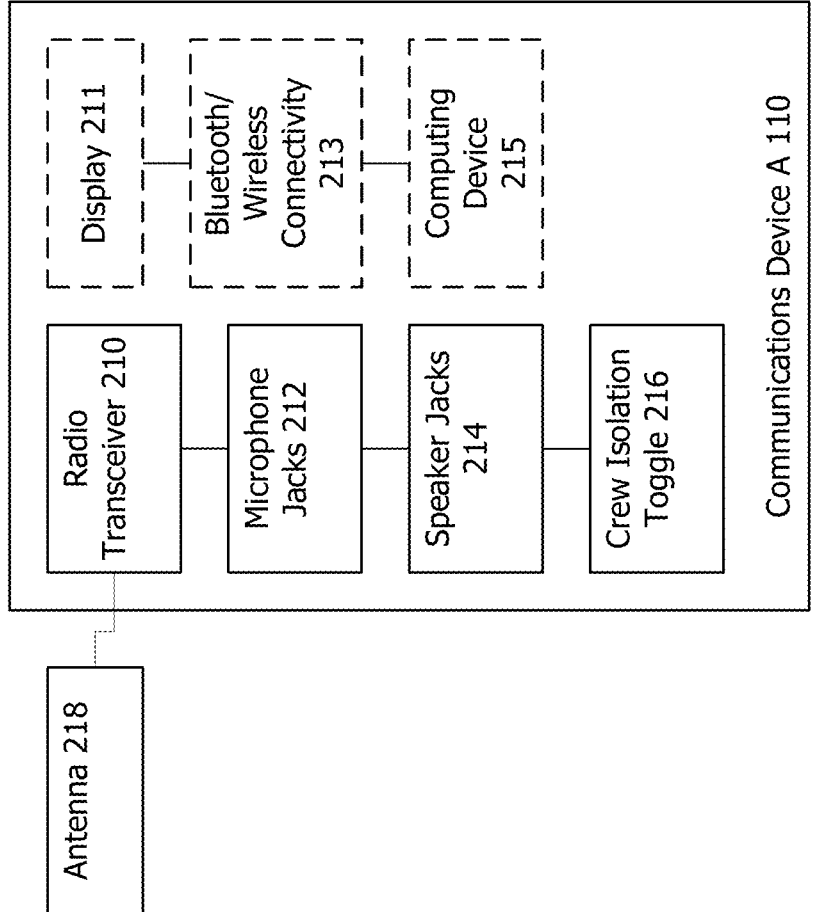
FIG. 2 is a functional block diagram of a communications device.

FIG. 2 is a functional block diagram of a communications device 200. The communications device A 110 is shown, but the components shown and discussed may equally be in or in communication with any of the other communication device types shown above. As discussed above, some of these components may be integral to the device while others may be merely in communications with the device 110.

The communications device A 110 includes a radio transceiver 210, microphone jacks 212, speaker jacks 214, and a crew isolation toggle 216. An antenna 218 is also connected to the communications device A 110. The communications device A 110 may also optionally include one or more of a display 211, Bluetooth/wireless connectivity 213, and a computing device 215.

The radio transceiver 210 is a combination receiver and transmitter. In a general sense, these devices have been commonplace since the early 1900s. In a simple form, the transmitter modulates (amplitude and/or frequency) to impart a waveform to the radio waves to thereby add "data" to the radio wave which is then transmitted in the air over distance. The distances data may be sent vary with the power of the transmitter and the types of radio waves used (e.g. their frequency). For purposes of this application, typically handheld walkie-talkie style radio transceivers transmit and receive in the 27 MHz and the 400-500 Mhz ranges of the UHF spectrum. Other spectrums may be used for other purposes.

The microphone jacks 212 are plugs with electrical connections for use with a microphone used to capture human voice (or other audio) and to convert it into electrical signals for transmission by the transceiver. In a preferred case the communications device A 110 is a dash-mounted device with at least four microphone jacks 212 to which a driver, a rider, and multiple "crew" connections are available, likely on the back side of the communications device A 110. The microphone jacks 212 preferably use commonly-used connection types so that various components may be connected thereto.

The speaker jacks 214 are plugs with electrical connections for use with a speaker used to reproduce the human voice (or other audio) that is received as electrical signals from the transceiver so that the audio may be heard by a user of a given communications device. These are discussed a speaker jacks, but the speakers are typically small head-mounted speakers typically called earphones or headphones. Still, other speaker types are possible. The speaker jacks 214 preferably use commonly-used connection types so that various components may be connected thereto.

The crew isolation toggle 216 is a switch, button, software setting, on-display button or setting, or other mechanism used to selectively enable and disable transmission by a sub-set of the potential users of the communications device A 110 on a selected frequency channel of the radio transceiver 210. The crew isolation toggle 216 may operate in a number of ways. Preferably, there are at least two plugs in the exterior of the communications device A 110 that are for a driver and co-driver. Those plugs are designated as such so as to differentiate them from other riders (e.g. crew, or children) in the UTV, off road vehicle or the like. Those individuals will form the "driving" crew, while the others will be selected members of the crew that are differentiated from the driving crew. The rest of the users of the communications device A 110 may be connected to the communications device A 110 on plugs suitable for other users. In this way, the two sets of users may be differentiated from one another—e.g. users that should always be able to communicate with each other and on the designated channel and those users that should not necessarily always be able to communicate with each other and on the designated channel.

The crew isolation toggle 216, as will be discussed more fully below, operates to disable the ability of those not in the driving crew to communicate freely on the designated channel. This may take place in a number of ways, but in effect, it enables the driver and co-driver to "mute" the other riders while still enabling those riders to both (1) hear the driver and co-driver and, potentially, to (2) hear and communicate with each other.

The crew isolation toggle 216 may operate in a number of ways, each discussed below. Preferably, the crew isolation toggle 216 is simply a button or switch on the exterior of communications device A 110 that may easily be operated while a driver/co-driver is in gloves.

The display 211 is an optional component that may display functions, software-operated buttons, battery status (if any), associated channels being broadcast and listened on, and other information relevant to a user. The display 211 may merely be a display or may incorporate a touchscreen capability to enable interaction with the communications device A 110.

The Bluetooth/wireless connectivity 213 is another optional component that is a chip or a part of a system-on-a-chip or multiple components that enable the communications device A 110 to communicate with other devices (e.g. a Bluetooth® headset) near the communications device A 110. It may act in much the same way as the microphone jacks 212, to enable a secondary device to capture audio and/or reproduce audio for transmission by the radio transceiver 210.

The computing device 215 is another optional component that is a computing device (FIG. 3) that may enable some or all of the functionality of the communications device A 110 to be enabled through software. It may be used to perform some or all of the functions described herein. It may also enable the touchscreen functionality to drive the display and alter the operation of the communications device A 110 in response to its programming—including the functionality associated with the crew isolation toggle 216.

Figure 3:
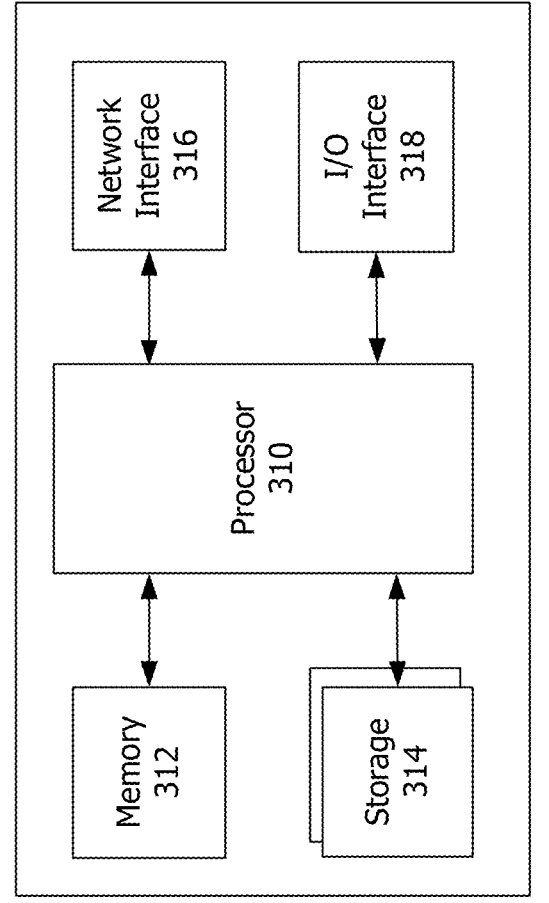
FIG. 3 is a block diagram of computing device.

Turning to FIG. 3 a block diagram of a computing device 300 is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 310 coupled to a memory 312, storage 314, a network interface 316 and an I/O interface 318. The processor 310 may be or include one or more microprocessors and application specific integrated circuits (ASICs).

The memory 312 may be or include RAM, ROM, DRAM, SRAM and MRAM, and may include firmware, such as static data or fixed instructions, BIOS, system functions, configuration data, and other routines used during the operation of the computing device 300 and processor 310. The memory 312 also provides a storage area for data and instructions associated with applications and data handled by the processor 310. As used herein, the word memory specifically excludes transitory medium such as signals and propagating waveforms.

The storage 314 may provide non-volatile, bulk or long-term storage of data or instructions in the computing device 300. The storage 314 may take the form of a disk, tape, CD, DVD, SSD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 316 is responsible for communications with external devices using wired and wireless connections reliant upon protocols such as 802.11x, Bluetooth®, Ethernet, satellite communications, and other protocols. The network interface 316 may be or include the internet.

The I/O interface 318 may be or include one or more buses or interfaces for communicating with computer peripherals such as mice, keyboards, cameras, displays, microphones, and the like.

Figure 4:
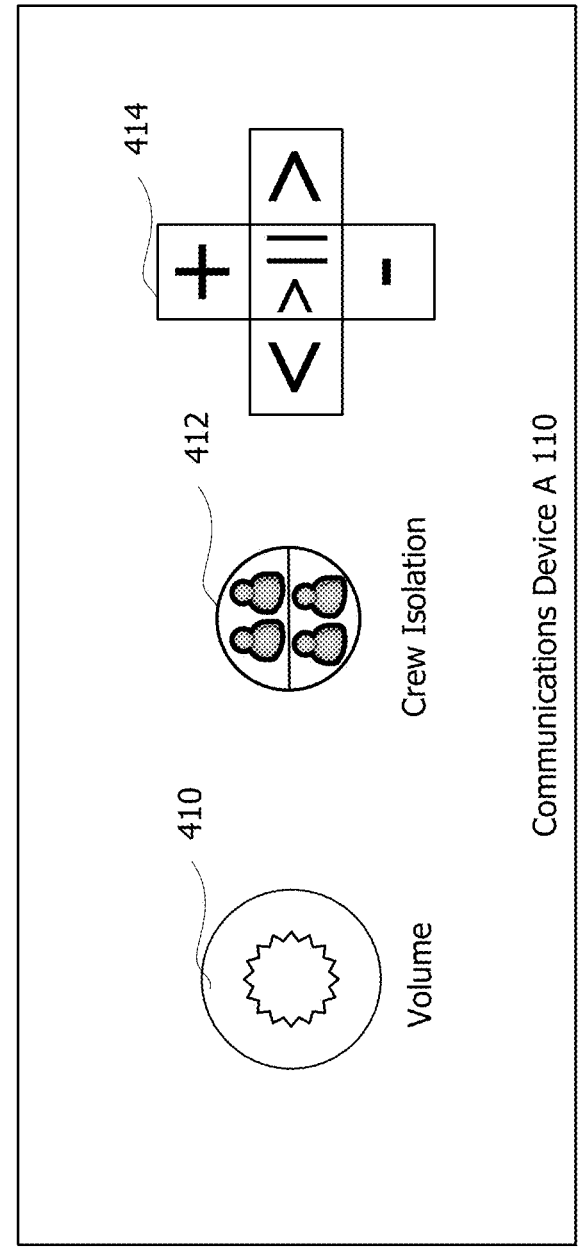
FIG. 4 is an example front design of a communications device.

FIG. 4 is an example front design of a communications device. The communications device A 110 includes a volume knob 410, a crew isolation button 412 and a control set 414.

The volume knob 410 enables a user to quickly dial up or down the volume for all listeners to the speakers of the communications device A 110.

The crew isolation button 412 is a typical example of the crew isolation toggle 216 (FIG. 2). It is a push-button, push once for one, push again for off, that enables and disables the crew isolation toggle discussed herein. Other toggles are possible, as discussed above, but this is a common example of the type of toggle 216 that is typical.

The control set 414 enables an operator to change the radio frequency channel and the volume and may pause or restart communications entirely for everyone, depending on the selected buttons depressed. Many riders choose to listen to music through their radios. This control set 414 may also operate to control the music input from an auxiliary source.

Figure 5:
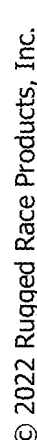
FIG. 5 is an example back design of a communications device.
Figure 5:
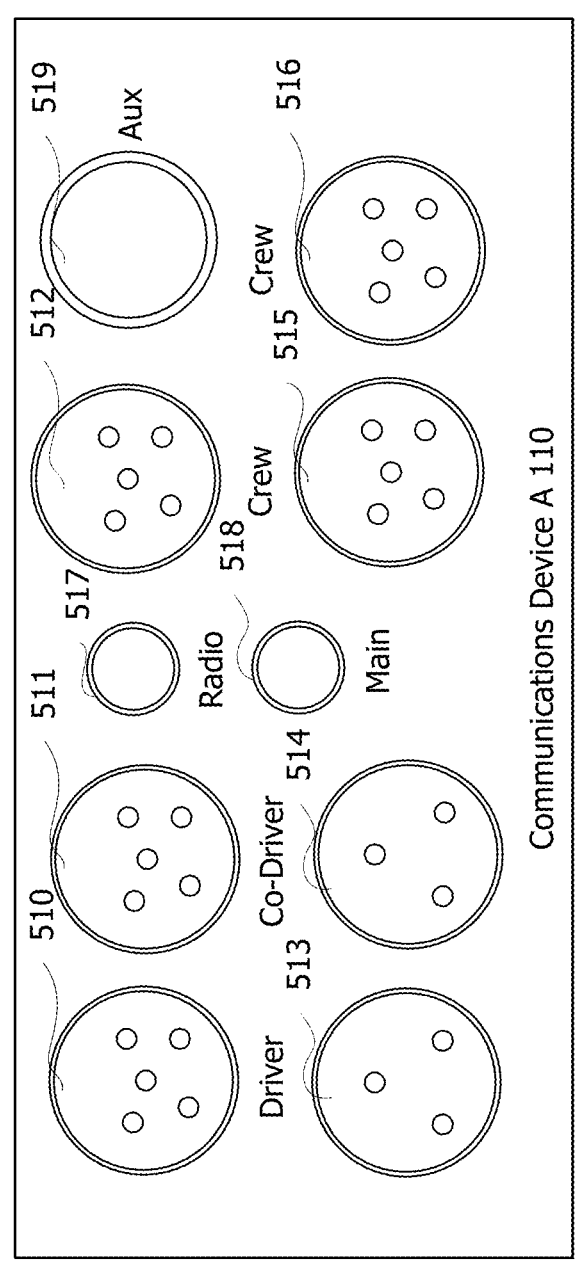

FIG. 5 is an example rear design of a communications device. The communications device A 110 includes driver connector 510, co-driver connector 511, driver push-to-talk connector 513, co-driver push-to-talk connector 514, crew connectors 512, 515, and 516, as well as an auxiliary connector 519. The communications device A 110 includes a radio connector 517 and a main connector 518. The design shown is merely exemplary of a dash-mounted unit. More or fewer connections may be included in a given communications device.

The driver connector 510 and co-driver connector 511 are combined microphone and speaker connectors for wired connection of headsets or helmet-integral speaker and microphone combinations.

The driver push-to-talk connector 513 and the co-driver push-to-talk connector 514 are connectors for connecting to a push-to-talk toggle or controller that enables the driver and/or co-driver to speak only when the toggle is depressed or otherwise activated.

The crew connectors 512, 515, and 516 are connectors for combined microphone and speakers for wired connection to headsets or helmet-integral speaker and microphone combinations. The crew do not have push-to-talk connectors because they typically do not need them.

An auxiliary connector 519 is provided for service purposes or, for example, for input of music or mobile phone communications from an auxiliary source.

The radio connector 517 may be used to integrate the communications device A 110 with a separate radio component which may include the radio transceiver and connections with antennas and channel selections and the like. In other cases, the communications device A 110 may incorporate a radio transceiver and antenna connection itself.

The main connector 518 may join the communications device A 110 to a power source.

Description of Processes

Figure 6:
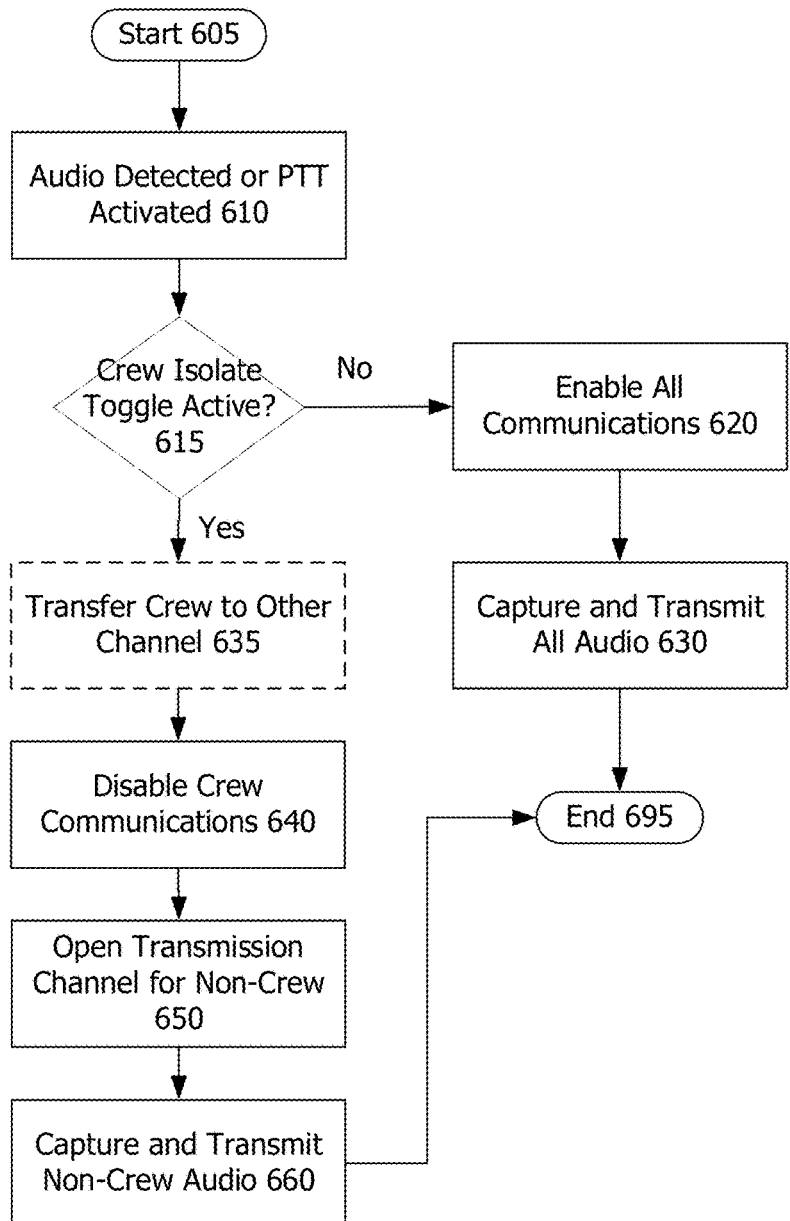
FIG. 6 is a flowchart of a method for use of a radio crew isolation system.

FIG. 6 is a flowchart of a method for use of a radio crew isolation system. The process begins at start 605 and ends at end 695, but it may take place many times or repeat many times before ending.

Following the start 605, audio is detected or push-to-talk is activated at 610 by one of the users of a crew isolation system communications device. This is an indication that at least one of the users of the communications device wishes to communicate on the channel with the other users and/or a home base or other listeners on the channel.

Thereafter, a determination is made whether the crew isolate toggle is active at 615. This may be made by computer logic operating in software, but more likely is merely the presence of a state of either "on" or "off" of a particular button, switch, or other setting. If active, this indicates that selected members of a crew are presently not authorized to transmit audio on a given radio frequency channel using the communications device. If inactive, this means that every user of the communications device may transmit audio on the radio frequency channel.

If not active ("no" at 615), then the process continues with the enablement of all communications at 620. This means that every microphone connected to the communications device may broadcast either in an "open channel" mode or using push-to-talk mode.

Thereafter, audio generated by any user is captured and transmitted at 630 to all listeners on the radio frequency channel.

The process then ends at 695.

However, if the crew isolate toggle is active ("yes" at 615), then the process proceeds with an optional step of transferring selected members of the crew to another channel at 635. Here, in some cases, those individuals who are not the driver and co-driver are transferred to a different radio frequency channel so that they may continue to communicate with one another an potentially with others, but they are no longer able to broadcast audio on the main channel being used by the driver and co-driver. In this way, they can communicate with each other, and continue to hear all discussion by the driver and co-driver (at least in some cases) thereby listening to two channels, but only broadcasting on one channel.

Next, the crew communications—that is the communications of selected members of the crew and not other members—are disabled at 640. This may take place in a number of ways. As indicated in optional step 635, this may be by transferring the selected members to another channel entirely or partially (listening on main channel, listening and broadcasting on subsidiary channel). Alternatively, this may mean simply muting those selected members so they can continue to hear on the main channel, but may not generate audio. Still further alternatively, this may mean that their microphones are disabled or the electrical connections associated with the transmission portion of their devices may be temporarily disabled while the crew isolate toggle is active. However it takes place, the crew communications are disabled at 640.

The transmission channel is then opened (or left open) only for non-crew at 650. Those individual devices that are not operated by the selected members continue to operate normally. Typically, these will be a driver and co-driver of the UTV or other vehicle, but other configurations are possible.

For those users, audio capture and transmission continues as normal at 660.

The process then ends at 695.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A communication system device comprising:
a radio transceiver configured to transmit and receive radio transmissions;
a radio frequency channel selector configured to select a desired radio frequency channel upon which to transmit and receive radio transmissions;
a crew isolation toggle, integral to the communication device, configured to: receive crew isolate toggle activation or deactivation of authorization to communicate for each of a plurality of crew members; based upon received toggle activation of authorization, identify and transfer selected members of the desired radio frequency channel to another radio frequency channel only to generate audio transmission; and
disable generation of audio transmission from selected members of the radio frequency channel to the radio frequency channel while still enabling the selected members to simultaneously receive audio transmission from the radio frequency channel and the another radio frequency channel.

2. The communication device of claim 1 wherein disabling generation of audio transmission comprises:
disabling a microphone on a communication device associated with the selected members of the radio frequency channel on the radio frequency channel.

3. The communication device of claim 1 wherein disabling generation of audio transmission comprises:
disabling radio transceivers associated with the selected members.

4. The communications device of claim 1 wherein enabling the crew isolation toggle mutes the selected members on the radio frequency channel.

5. The communications device of claim 1, wherein
a first communications device, operated by a first communications operator includes each of the elements of claim 1; and
one or more communications devices, operated by the selected members of the radio frequency channel includes all of the elements of claim 1 except the crew isolation toggle.

6. The communications device of claim 5 wherein the first communications device is also accessible to a second communications operator, and wherein when the crew isolation toggle is enabled, the selected members of the radio frequency channel may communicate solely with one another on a separate radio frequency channel dedicated to the selected members.

7. The communications device of claim 1 wherein the crew isolation toggle is a selected one of: a switch, a button, a dial, a digital setting, and a user interface element on a display.

8. A communications device comprising:
a radio transceiver configured to receive and transmit radio transmissions on a selected radio frequency channel;
at least one input port for a microphone for capturing audio and a speaker for generating audio in response to signals received from the radio transceiver;
an antenna, connected to the radio transceiver, configured to capture radio waves and provide the radio waves to the transceiver; and
a crew isolation toggle, integral to the communication device, configured to: receive crew isolate toggle activation or deactivation of authorization to communicate for each of a plurality of crew members; based upon received toggle activation of authorization, identify and transfer selected members of the desired radio frequency channel to another radio frequency channel only to generate audio transmission; and
disable generation of audio transmission from selected members of the radio frequency channel to the radio frequency channel while still enabling the selected members to simultaneously receive audio transmission from the radio frequency channel and the another radio frequency channel.

9. The communication device of claim 8 wherein disabling generation of audio transmission comprises:
disabling a microphone associated with the selected members of the radio frequency channel on the radio frequency channel.

10. The communication device of claim 8 wherein disabling generation of audio transmission comprises:
disabling radio transceivers associated with the selected members.

11. The communications device of claim 8 wherein enabling the crew isolation toggle mutes the selected members on the radio frequency channel.

12. The communications device of claim 8, wherein a microphone and speaker combination operated by a first communications operator;

a microphone and speaker combination operated by a second communications operator;

one or more microphone and speaker combinations operated by the selected members of the radio frequency channel; and wherein only the one or more microphone and speaker combinations operated by the selected members of the radio frequency channel are affected by operation of the crew isolation toggle.

13. The communications device of claim 8 wherein the crew isolation toggle is a selected one of: a switch, a button, a dial, a digital setting, and a user interface element on a display.

14. A communications device comprising:

a radio transceiver, integral to the communications device, configured to send and receive radio waves and configured to convert radio waves into electrical signals;

an antenna configured to capture radio waves and provide them to the transceiver;

a plurality of input and output ports, each configured for use with a microphone and speaker combination used by one of a first or second operator of the communications device and selected operators of the communications device; and a crew isolation toggle configured to: receive-crew isolate toggle activation or deactivation of authorization to communicate for each of a plurality of crew members;

based upon received toggle activation of authorization, identify and transfer selected members of the desired radio frequency channel to another radio frequency channel only to generate audio transmission; and disable generation of audio transmission from selected members of the radio frequency channel while still enable the selected members to simultaneously receive audio transmission from the radio frequency channel and the another radio frequency channel.

15. The communications device of claim 14 further comprising software, operating on a processor and associated memory, programmed to:

detect enablement of the crew isolation toggle; and disable audio generation by the selected operators of the communications device in response to enablement of the crew isolation toggle.

16. The communication device of claim 14 wherein disabling generation of audio transmission comprises:

disabling a microphone associated with the selected members of the radio frequency channel on the radio frequency channel.

17. The communication system of claim 1 wherein disabling generation of audio transmission comprises a selected one of:

disabling radio transceivers associated with the selected members; and muting the selected members on the radio frequency channel.

* * * * *